United States Patent
Liu et al.

(10) Patent No.: US 11,519,798 B2
(45) Date of Patent: Dec. 6, 2022

(54) RESIDUAL STRESS DETECTION DEVICE AND DETECTION METHOD THEREOF

(71) Applicant: METAL INDUSTRIES RESEARCH & DEVELOPMENT CENTRE, Kaohsiung (TW)

(72) Inventors: Zong-Rong Liu, Kaohsiung (TW); Hsiu-An Tsai, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 1023 days.

(21) Appl. No.: 16/223,205

(22) Filed: Dec. 18, 2018

(65) Prior Publication Data

US 2020/0191670 A1  Jun. 18, 2020

(51) Int. Cl.
| | |
|---|---|
| *G01L 1/25* | (2006.01) |
| *G01N 23/2055* | (2018.01) |
| *G01N 23/205* | (2018.01) |
| G01N 23/20008 | (2018.01) |
| G01L 5/00 | (2006.01) |

(52) U.S. Cl.
CPC .............. *G01L 1/25* (2013.01); *G01L 5/0047* (2013.01); *G01N 23/205* (2013.01); *G01N 23/20008* (2013.01); *G01N 23/2055* (2013.01)

(58) Field of Classification Search
CPC ..... G01L 1/25; G01L 5/0047; G01N 23/2055; G01N 23/205; G01N 23/20008
See application file for complete search history.

(56) References Cited

U.S. PATENT DOCUMENTS

| | | | | |
|---|---|---|---|---|
| 6,925,146 | B2 * | 8/2005 | Brauss | G01N 23/20 378/81 |
| 7,918,141 | B1 * | 4/2011 | Sathish | G01N 3/60 73/800 |
| 9,613,728 | B2 * | 4/2017 | Brauss | G21K 1/06 |
| 2016/0209340 | A1 * | 7/2016 | Cernatescu | G01N 23/20016 |
| 2017/0082561 | A1 * | 3/2017 | Yasukawa | G01N 23/205 |
| 2017/0241925 | A1 * | 8/2017 | Bao | G01N 25/16 |

FOREIGN PATENT DOCUMENTS

WO    WO-2007069639 A1 *  6/2007  ............. G01N 23/20

* cited by examiner

*Primary Examiner* — Jonathan M Dunlap
(74) *Attorney, Agent, or Firm* — WPAT, PC (57) ABSTRACT

A residual stress detection device for a curved surface coating and a detection method thereof is provided, where its structure includes: a detection piece carrier, configured to fix the detection piece, so that a to-be-detected point on the detection piece remains at a highest point; an X-ray generation source, radiating an X-ray to the to-be-detected point fixedly or along a path; a detection element, including a moving mechanism, where the moving mechanism moves the detection element along a path extending toward a direction orthogonal to an incident direction of the X-ray, so that the detection element receives and detects intensity of a diffraction X-ray at a position of the diffraction X-ray; and a stress calculation module, obtaining a strain value based on an intensity peak of the diffraction X-ray detected by the detection element, and calculating a residual stress value of the detection piece by using a formula.

9 Claims, 6 Drawing Sheets

RESIDUAL STRESS DETECTION DEVICE AND DETECTION METHOD THEREOF

BACKGROUND

Technical Field

The present invention relates to a residual stress detection device and a detection method thereof, and more specifically, to a residual stress detection device for a curved surface coating and a detection method thereof.

Related Art

With the rapid development of processing industries, coating technologies, and mould industries, and the development toward high-valued, high-precision, and functional directions, the coating life analysis is gradually paid more attention to. A residual stress is one of important indicators for the life analysis. Because most carriers are in multi-curved-surface geometric shapes, problems, such as measurement errors and value distortion, are easily caused by the shapes.

As for the residual stress detection, there are contact detection and non-destructive detection. The common contact residual stress measurement is mainly a blind-hole method, but because the coating thickness is at a micron level, the blind-hole method is no longer suitable. Therefore, the coating residual stress measurement gradually focuses on the non-destructive measurement, but the non-destructive residual stress measurement uses an X-ray diffraction method as the mainstream, and the non-destructive measurement can be further performed in any process and each use phase, to facilitate full control. However, because the non-contact measurement is used, a workpiece carrier, a material property, a geometric shape, a residual stress calculation parameter may all affect measurement data.

The residual stress is an important basis for determining process quality and material service life. Due to usage forms of workpieces, the non-destructive measurement is gradually focused on, wherein the X-Ray diffraction method is the mainstream. Currently, in the residual stress measurement principle of the X-Ray diffraction method, the material lattice is deformed by an impact of a stress, and a residual stress is calculated with different measurement parameters and by using a fitting method. Therefore, there are two measurement manners: $\sin^2 \Psi$ and $\cos \alpha$. The $\sin^2 \Psi$ measurement parameter includes a plurality of variables such as a rotation angle ($\emptyset$) and an inclination angle ($\Psi$), and the $\sin^2 \Psi$ manner is applicable to small specimens and laboratory expensive equipment. For $\cos \alpha$, a diffraction ring is a variable and a light source and a detector is on a same side, and therefore, the $\cos \alpha$ manner is applicable to large workpieces and field measurement. However, the foregoing methods have the following disadvantages: 1. The residual stress measurement is mainly on a plane form, and is inapplicable to a curved surface; and 2. The calculation mode uses a linear fitting method, and an impact caused to the curved surface may cause measurement data distortion.

SUMMARY

The problem to be resolved by the present invention is directed to a residual stress detection device and a formula, applicable to residual stress detection of a coating in a curved surface shape, to resolve the problem in the existing detection technology that a residual stress value of a curved surface coating cannot be precisely quantified.

To resolve the foregoing problem, the present invention is directed to a residual stress detection device, applied to detection and calculation of a surface residual stress performed for a detection piece having a curved surface coating, where its structure includes: a detection piece carrier, configured to fix the detection piece, so that a to-be-detected point on the detection piece remains at a highest point; an X-ray generation source, radiating an X-ray to the to-be-detected point fixedly or along a path; a detection element, including a moving mechanism, where the moving mechanism moves the detection element along a path extending toward a direction orthogonal to an incident direction of the X-ray, so that the detection element receives and detects intensity of a diffraction X-ray at a position of the diffraction X-ray; and a stress calculation module, obtaining a strain value based on an intensity peak of the diffraction X-ray detected by the detection element, and calculating a residual stress value of the detection piece by using a formula.

A residual stress detection method performed by applying the foregoing residual stress detection device includes steps: fixing the detection piece to the detection piece carrier, and adjusting the to-be-detected point to the highest point; radiating the X-ray generation source to the to-be-detected point; moving the detection element along a path of extending toward a direction orthogonal to the incident direction of the X-ray, and receiving and detecting intensity of the diffraction X-ray to obtain a strain value; and calculating the residual stress value of the to-be-detected point by using the stress calculation module and the strain value.

In the foregoing embodiment, the formula is:

$$\sigma_f = E_f \left[ \left( \frac{\varepsilon_{XRD} E_f h_f}{E_f h_f + E_s h_s} + \varepsilon_{XRD} \right) + \left( x - \frac{E_f h_f^2 - E_s h_s^2}{2(E_f h_f + E_s h_s)} \right) k \right].$$

In the foregoing formula, $\sigma_f$ is a residual stress of the coating, $E_f$ is a Young's modulus of the coating, $\varepsilon_{XRD}$ is the strain value obtained by the residual stress detection device of the present invention, $E_s$ is a Young's modulus of a substrate, $h_s$ is a substrate thickness, $h_f$ is a coating thickness, k is a curvature of the to-be-detected point, and x is a depth position of the to-be-detected point.

In an embodiment, the detection piece carrier further includes a rotating mechanism, and the rotating mechanism may rotate the detection piece carrier to change an incident direction of an X-ray received by the detection piece.

In an embodiment, the detection piece carrier includes a detection piece fixing structure.

In the foregoing embodiment, the detection piece fixing structure has a fixing groove and a locking structure which is for locking the detection piece in the fixing groove.

In the foregoing embodiment, the detection piece fixing structure further includes a level adjusting structure.

In an embodiment, the level adjusting structure is an ejection form, and is disposed at the bottom of the fixing groove, and the to-be-detected point is adjusted to the highest point by ejecting a position at an end of the detection piece.

Main features of the present invention are: 1. The present invention is applicable to detection of a residual stress value of a curved surface coating piece; 2. The stress calculation module and the detection piece carrier provided in the present invention may be integrated in a currently used X-ray generator, and no significant costs need to be increased; and 3. Adjusting the to-be-detected point to the highest point can reduce detection errors and decrease curved surface impact factors, so as to effectively master geometric characteristics, and break through detection errors caused by the to-be-detected point on curved surface shape deviation.

The following further describes the present invention with reference to the accompanying drawings and specific embodiments, so that a person skilled in the art can further easily understand the present invention and implement the present invention.

DETAILED DESCRIPTION

Figure 1A:
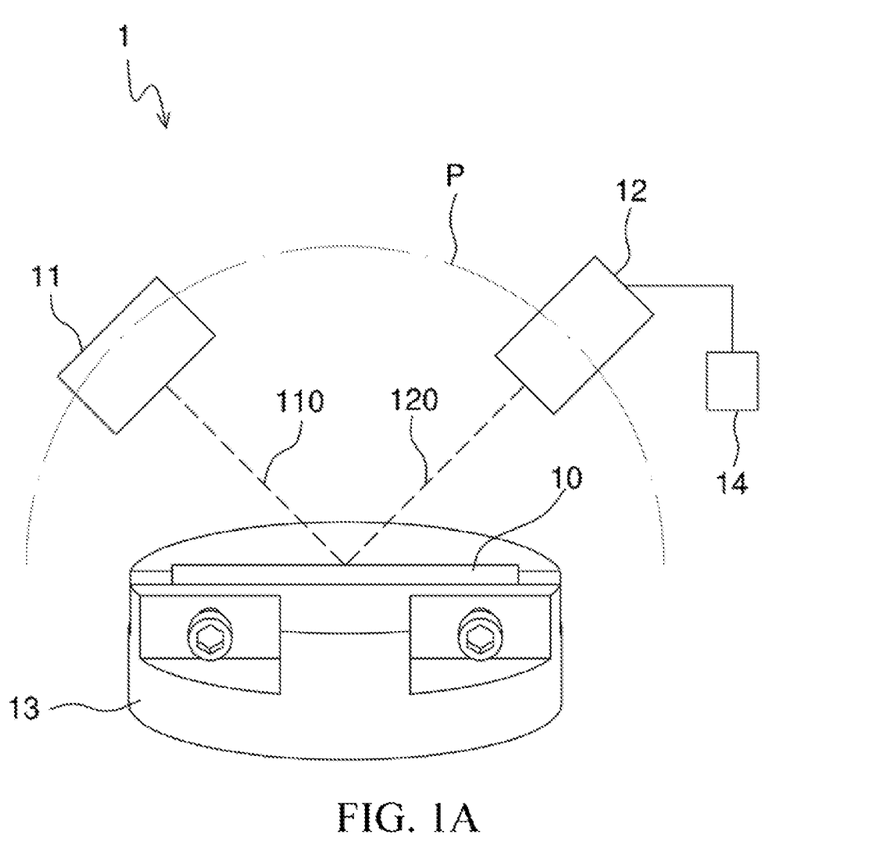
FIG. 1A is a schematic structural diagram of a residual stress detection device according to the present invention.
Figure 1B:
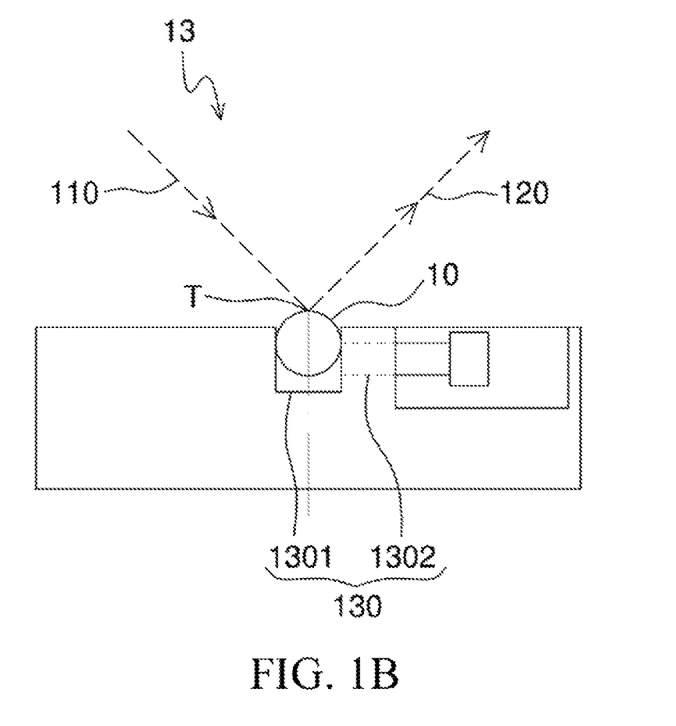
FIG. 1B is a schematic diagram of a detection manner of the residual stress detection device according to the present invention.
Figure 1C:
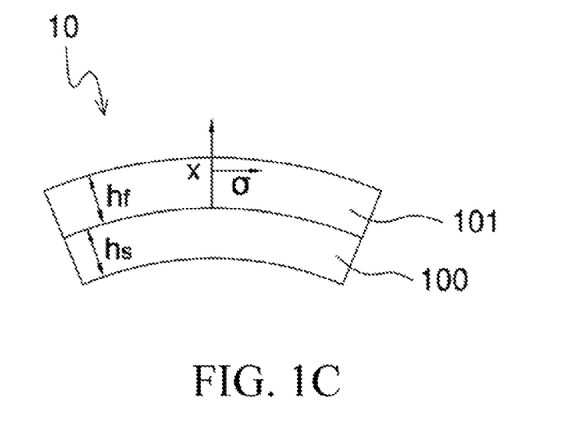
FIG. 1C is a schematic structural diagram of a detection piece having a curved surface coating according to the present invention.

As shown in FIG. 1A to FIG. 1C, the present invention discloses a residual stress detection device 1, applied to detection and calculation of a surface residual stress performed for a detection piece 10 having a curved surface coating, where its structure includes: a detection piece carrier 13, configured to fix the detection piece 10, so that a to-be-detected point T of the detection piece 10 remains at a highest point; an X-ray generation source 11, radiating an X-ray 110 to the to-be-detected point T fixedly or along a path P; a detection element 12, including a moving mechanism, where the moving mechanism moves the detection element 12 along the path P toward a direction orthogonal to an incident direction of the X-ray 110, that is, the path P is orthogonal to both the incident direction of the X-ray 110 and an emergent direction of a diffraction X-ray 120, so that the detection element 12 receives and detects intensity of the diffraction X-ray 120 at a position of the diffraction X-ray 120; and a stress calculation module 14, obtaining a strain value ε based on an intensity peak of the diffraction X-ray 120 detected by the detection element 12, and calculating a residual stress value of the detection piece 10 by using a formula.

As shown in FIG. 1B, a residual stress detection method performed by the residual stress detection device of the present invention includes steps: fixing the detection piece 10 to the detection piece carrier 13, and adjusting the to-be-detected point T to the highest point; radiating the X-ray 110 generation source 11 to the to-be-detected point T; as shown in FIG. 1A, moving the detection element 12 along a path P, so that the detection element 12 can be toward a direction orthogonal to the incident direction of the X-ray 110, and receiving and detecting intensity of the diffraction X-ray 120 to obtain a strain value ε; and calculating the residual stress value of the to-be-detected point T by using the stress calculation module 14 shown in FIG. 1A and the strain value ε.

In the foregoing embodiment, the formula is $$\sigma_f = E_f \left[ \left( \frac{\varepsilon_{XRD} E_f h_f}{E_f h_f + E_s h_s} + \varepsilon_{XRD} \right) + \left( x - \frac{E_f h_f^2 - E_s h_s^2}{2(E_f h_f + E_s h_s)} \right) k \right],$$

where $\sigma_f$ is a residual stress of the coating, $E_f$ is a Young's modulus of the coating, $\varepsilon_{XRD}$ is the strain value obtained by the residual stress detection device of the present invention, $E_s$ is a Young's modulus of a substrate, $h_s$ is a substrate thickness, $h_f$ is a coating thickness, k is a curvature of the to-be-detected point T, and x is a depth position of the to-be-detected point T.

In the embodiment of FIG. 1B, the detection piece carrier 13 includes a detection piece fixing structure 130, and the detection piece fixing structure 130 is a fixing groove 1301 and a locking structure 1302, for locking the detection piece 10 in the fixing groove 1301.

In an embodiment, the detection piece carrier 13 further includes a rotating mechanism, and the rotating mechanism may rotate the detection piece carrier 13 to change an incident direction of an X-ray 110 received by the detection piece 10.

In the foregoing embodiment, the rotating mechanism may rotate by two-dimensional 360 degrees.

In the foregoing embodiment, the rotating mechanism may rotate by three-dimensional 360 degrees.

By using the foregoing residual stress detection device, when the X-ray 110 is shone on the to-be-detected point T of the detection piece 10, the detection element 12 may receive the intensity of the diffraction X-ray 120, and obtain an intensity peak to further obtain the strain value c of the to-be-detected point T.

As shown in FIG. 1C, according to the structure, the detection piece 10 having a curved surface coating may be divided into a substrate layer 100 and a coating layer 101, which respectively have a substrate thickness $h_s$ and a coating thickness $h_f$. After the strain value ε of the to-be-detected point T is obtained by using the detection device and the detection method of the present invention, the strain value ε may be substituted into the formula:

$$\sigma_f = E_f \left[ \left( \frac{\varepsilon_{XRD} E_f h_f}{E_f h_f + E_s h_s} + \varepsilon_{XRD} \right) + \left( x - \frac{E_f h_f^2 - E_s h_s^2}{2(E_f h_f + E_s h_s)} \right) k \right]$$

to calculate the residual stress value $\sigma_f$.

In the formula, $\sigma_f$ is a residual stress of the coating, $E_f$ is a Young's modulus of the coating, $\varepsilon_{XRD}$ is the strain value obtained by the residual stress detection device of the present invention, $E_s$ is a Young's modulus of a substrate, $h_s$ is a substrate thickness, $h_f$ is a coating thickness, k is a curvature, and x is a depth position of the to-be-detected point T.

Figure 2A:
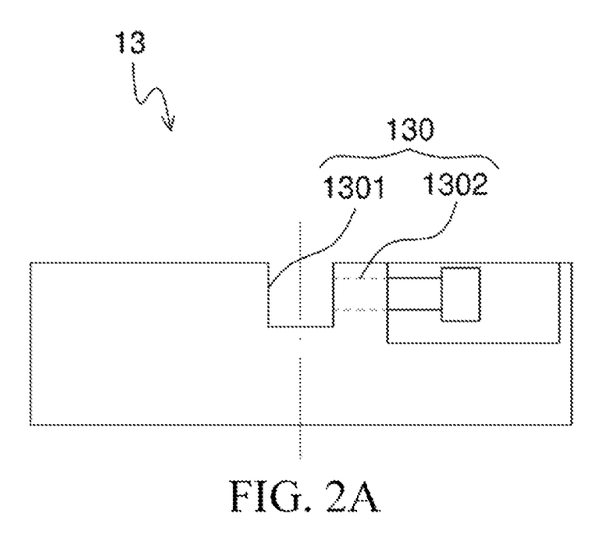
FIG. 2A is a schematic diagram of a detection piece carrier according to an embodiment of the present invention.
Figure 2B:
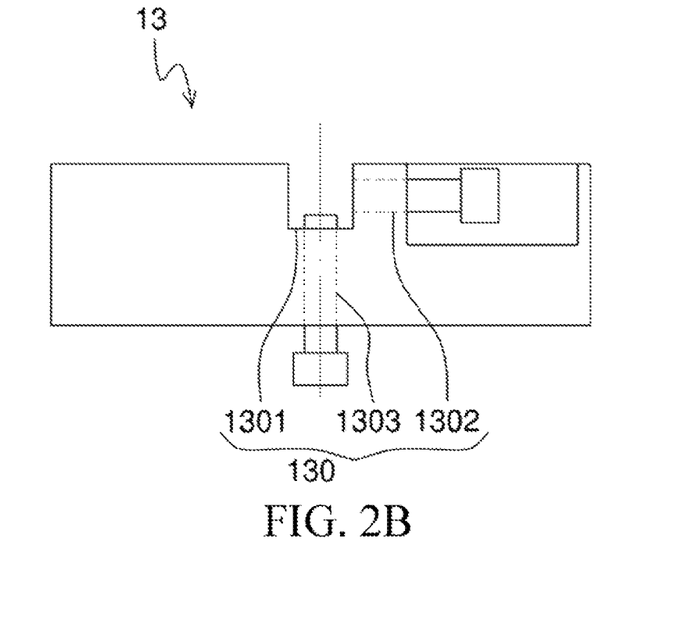
FIG. 2B is a schematic diagram of a detection piece carrier according to another embodiment of the present invention.

Referring to FIG. 2A and FIG. 2B, FIG. 2A and FIG. 2B are schematic diagrams of different embodiments of the detection piece carrier 13 according to the present invention.

As shown in FIG. 2A, the detection piece carrier 13 of the present invention includes a detection piece fixing structure 130, where the detection piece fixing structure 130 is a fixing groove 1301 and a locking structure 1302, for locking the detection piece 10 in the fixing groove 1301, to ensure that the to-be-detected point T may remain at a position of the highest point shown in FIG. 1B. Remaining the to-be-detected point T at the highest point may reduce detection errors and decrease curved surface impact factors, so as to effectively master geometric characteristics, and break through detection errors caused by the to-be-detected point on curved surface shape deviation.

As shown in FIG. 2B, the detection piece carrier 13 of the present invention includes a detection piece fixing structure 130, where the detection piece fixing structure 130 is a fixing groove 1301, a locking structure 1302, and a level adjusting structure 1303. The level adjusting structure 1303 is an ejection form, and is disposed at the bottom of the fixing groove 1301, and the level adjusting structure 1303 adjusts the to-be-detected point T to the highest point by ejecting a position at an end of the detection piece 10, to further reduce detection errors and decrease curved surface impact factors, so as to effectively master geometric characteristics, and break through detection errors caused by the to-be-detected point on curved surface shape deviation.

Figure 3:
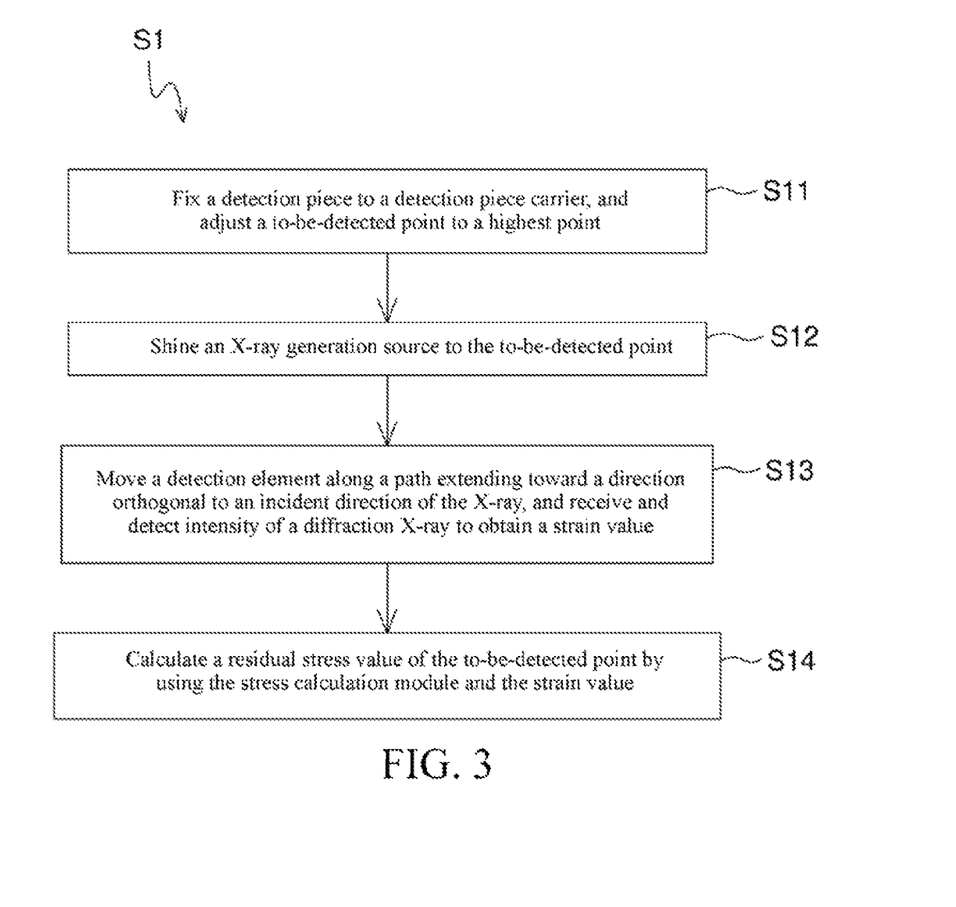
FIG. 3 is a flowchart of a residual stress detection method according to the present invention.

Referring to FIG. 3, FIG. 3 is a residual stress detection method S1 performed by applying the foregoing residual stress detection device 1, and the method S1 includes steps:

Step S11: Fix the detection piece to the detection piece carrier, and adjust the to-be-detected point to the highest point.

Step S12: Radiate the X-ray generation source to the to-be-detected point.

Step S13: Move the detection element, so that the detection element can be toward a direction orthogonal to an incident direction of the X-ray, and receive and detect intensity of the diffraction X-ray to obtain a strain value.

Step S14: Calculate a residual stress value of the to-be-detected point by using the stress calculation module and the strain value.

In an embodiment, the detection piece carrier may rotate to change an incident direction of an X-ray received by the detection piece, to detect intensity of an X-ray diffracted by the to-be-detected point from a different angle, to further obtain an accurate strain value of the to-be-detected point.

The strain value obtained by using the foregoing method is substituted into the following formula:

$$\sigma_f = E_f \left[ \left( \frac{\varepsilon_{XRD} E_f h_f}{E_f h_f + E_s h_s} + \varepsilon_{XRD} \right) + \left( x - \frac{E_f h_f^2 - E_s h_s^2}{2(E_f h_f + E_s h_s)} \right) k \right]$$

to calculate the residual stress value $\sigma_f$.

In the formula, $\sigma_f$ is a residual stress of the coating, $E_f$ is a Young's modulus of the coating, $\varepsilon_{XRD}$ is the strain value obtained by the residual stress detection device of the present invention, $E_s$ is a Young's modulus of a substrate, $h_s$ is a substrate thickness, $h_f$ is a coating thickness, k is a curvature of the to-be-detected point, and x is a depth position of the to-be-detected point.

The residual stress detection device and the detection method thereof in the present invention have the following features: 1. The present invention breaks through the known problem that residual stress detection is only applicable to a plane detection piece, and may be applied to detection of a residual stress value of a curved surface coating piece; 2. The stress calculation module and the detection piece carrier provided in the present invention may be integrated in a currently used X-ray generator, and no significant costs need to be increased; and 3. Adjusting the to-be-detected point to the highest point can reduce detection errors and decrease curved surface impact factors, so as to effectively master geometric characteristics, and break through detection errors caused by the to-be-detected point on curved surface shape deviation.

The foregoing description only records implementations or embodiments of technical means used in the present invention to resolve the problem, and is not used to limit the scope of the patent implementation of the present invention. Any equivalent change or modification conforming to the content of the claims of the present invention, or made without departing from the claims of the present invention shall fall within the patent scope of the present invention.

What is claimed is:

1. A residual stress detection device, applied to detection and calculation of a surface residual stress performed for a detection piece having a curved surface coating, and comprising:
    a detection piece carrier, configured to fix the detection piece;
    an X-ray generation source, radiating an X-ray to the to-be-detected point fixedly or along a path;
    a detection element, comprising a moving mechanism, wherein the moving mechanism moves the detection element along the path, so that the detection element can receive and detect intensity of a diffraction X-ray toward a direction orthogonal to an incident direction of the X-ray; and
    a stress calculation module, obtaining a strain value based on an intensity peak of the diffraction X-ray detected by the detection element, and calculating a residual stress value of the detection piece by using a formula;
    wherein the formula is:

$$\sigma_f = E_f \left[ \left( \frac{\varepsilon_{XRD} E_f h_f}{E_f h_f + E_s h_s} + \varepsilon_{XRD} \right) + \left( x - \frac{E_f h_f^2 - E_s h_s^2}{2(E_f h_f + E_s h_s)} \right) k \right]$$

wherein $\sigma_f$ is a residual stress of the coating, $E_f$ is a Young's modulus of the coating, $\varepsilon_{XRD}$ is the strain value obtained by the residual stress detection device of the present invention, $E_s$ is a Young's modulus of a substrate, $h_s$ is a substrate thickness, $h_f$ is a coating thickness, k is a curvature, and x is a depth position of the to-be-detected point.

2. The residual stress detection device according to claim 1, wherein the detection piece carrier further comprises a rotating mechanism, and the rotating mechanism may rotate the detection piece carrier to change an incident direction of an X-ray received by the detection piece.

3. The residual stress detection device according to claim 1, wherein the detection piece carrier comprises a detection piece fixing structure.

4. The residual stress detection device according to claim 3, wherein the detection piece fixing structure is a fixing groove and a locking structure, for locking the detection piece in the fixing groove, so that a to-be-detected point on the detection piece remains at a highest point relative to the fixing groove.

5. The residual stress detection device according to claim 3, wherein the detection piece fixing structure further comprises a level adjusting structure.

6. The residual stress detection device according to claim 4, wherein the detection piece fixing structure further comprises a level adjusting structure.

7. The residual stress detection device according to claim 5, wherein the level adjusting structure is an ejection form, and is disposed at the bottom of the fixing groove, and the to-be-detected point is adjusted to the highest point by ejecting a position at an end of the detection piece.

8. A residual stress detection method for a curved surface coating, comprising steps:
   providing a detection piece carrier, wherein the detection piece carrier comprises a detection piece fixing structure, and the detection piece fixing structure is a fixing groove and a locking structure;
   locking a to-be-detected piece having a curved surface coating in the fixing groove, and adjusting a to-be-detected point on the curved surface coating to a highest point relative to the fixing groove;
   radiating an X-ray to the to-be-detected point by using an X-ray generation source;
   moving a detection element, so that the detection element is toward a direction orthogonal to an incident direction of the X-ray, and receiving and detecting intensity of a diffraction X-ray to obtain a strain value; and
   calculating a residual stress value of the to-be-detected point by using the strain value and a formula;
   wherein the formula is:

$$\sigma_f = E_f \left[ \left( \frac{\varepsilon_{XRD} E_f h_f}{E_f h_f + E_s h_s} + \varepsilon_{XRD} \right) + \left( x - \frac{E_f h_f^2 - E_s h_s^2}{2(E_f h_f + E_s h_s)} \right) k \right]$$

wherein $\sigma_f$ is a residual stress of the coating, $E_f$ is a Young's modulus of the coating, $\varepsilon_{XRD}$ is the strain value obtained by the residual stress detection device of the present invention, $E_s$ is a Young's modulus of a substrate, $h_s$ is a substrate thickness, $h_f$ is a coating thickness, k is a curvature, and x is a depth position of the to-be-detected point.

9. A residual stress detection device, applied to detection and calculation of a surface residual stress performed for a detection piece having a curved surface coating, and comprising:
   a detection piece carrier, configured to fix the detection piece;
   an X-ray generation source, radiating an X-ray to the to-be-detected point fixedly or along a path;
   a detection element, comprising a moving mechanism, wherein the moving mechanism moves the detection element along the path, so that the detection element can receive and detect intensity of a diffraction X-ray toward a direction orthogonal to an incident direction of the X-ray; and
   a stress calculation module, obtaining a strain value based on an intensity peak of the diffraction X-ray detected by the detection element, and calculating a residual stress value of the detection piece by using a formula;
   wherein the detection piece carrier comprises a detection piece fixing structure; and
   the detection piece fixing structure further comprises a level adjusting structure.

* * * * *